Aug. 6, 1968   T. E. BORG ETAL   3,396,357
TEMPERATURE SENSING CABLE AND METHOD FOR MAKING SAME
Filed April 10, 1964

INVENTORS
TORE ERNST BORG
FRANCIS E. ELLIOTT
BY STEPHEN ZYSK

*Allard A. Braddock*
ATTORNEY

United States Patent Office 3,396,357
Patented Aug. 6, 1968

3,396,357
TEMPERATURE SENSING CABLE AND
METHOD FOR MAKING SAME
Tore E. Borg and Francis E. Elliott, Syracuse, N.Y., and
Stephen Zysk, Stratford, Conn., assignors to General
Electric Company, a corporation of New York
Filed Apr. 10, 1964, Ser. No. 358,899
14 Claims. (Cl. 338—26)

The present invention relates to a cable having temperature sensing elements embedded therein and, more specifically, to a cable for use in measuring temperature gradients in water.

Cables having spaced temperature sensing elements such as thermistors associated therewith have been employed for the measuring of thermal gradients in water. To be completely satisfactory such devices must be capable of measuring temperatures within a high degree of accuracy while being compatible with standard shipboard handling techniques and the hostile environment presented by water. Further, such devices should be easily manufacturable in accordance with standard production line techniques.

Prior art devices of this type have featured the mounting of thermistors external to the cable or have required that openings be cut in the cable to receive the thermistors, as shown in U.S. Patent 2,792,481. In the prior art devices which employ externally mounted thermistors the ease of handling is seriously impaired and the thermistors are subject to damage during handling. In devices where openings must be cut in the cable either the thermistors are exposed to the hostile environment or sleeves must be employed such as shown in the above referred to Patent 2,792,481, which hamper handling due to the irregular surface of the resultant cable. Further, since the thermistors in both prior art types of devices are installed after fabrication of the cable is completed, neither of these devices is easily manufacturable through the use of standard production line techniques.

The present invention presents a cable for measuring thermal gradients which is fully compatible with standard shipboard handling techniques while insuring the requisite accuracy of measurement. Further, the cable of the present invention completely isolates the temperature sensing elements from the hostile environment and is compatible with standard production line manufacturing techniques.

Accordingly, an object of the present invention is to provide an improved cable for measuring thermal gradients in water which is compatible with standard shipboard handling techniques.

Further, another object of the present invention is to provide a temperature-measuring cable which completely isolate the temperature sensing elements from the hostile environment while still providing the requisite accuracy.

Yet, another object of the present invention is to provide a temperature-measuring cable which is easily manufacturable in accordance with standard production line techniques.

In general, the cable of this invention includes a plurality of insulated conductors or wires arrayed circumferentially around a central strength member. Thermistors, spaced along the cable at desired intervals, are electrically and mechanically connected to the associated conductor. Strain relieving means are incorporated to relieve strain between the conductor and the thermistor connection. The entire assembly may be enclosed by a sheath having a substantially uniform outer dimension.

The novel and distinctive features of the invention are set forth in the appended claims. The invention, itself, together with further objects and advantages thereof, may be best understood by reference to the following description and accompanying drawings in which:

Figure 1:
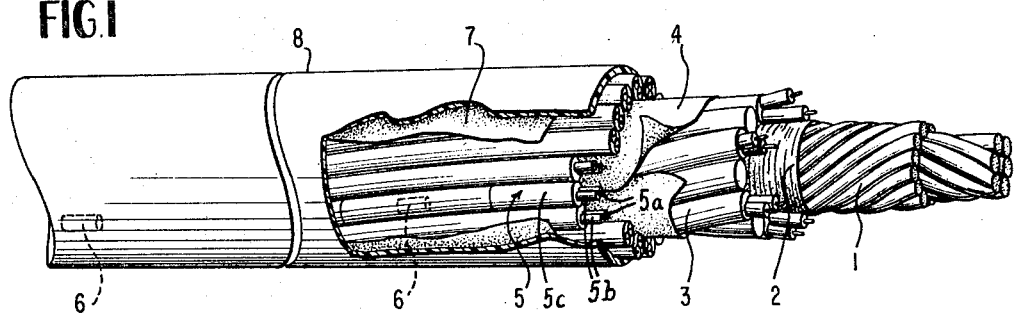
FIGURE 1 is a perspective view, partially broken away, of a length of the cable of the present invention.

Referring to FIGURE 1, there is shown a cable in accordance with the present invention. The cable is formed around a central strength member 1 comprising a stainless steel rope, the strength member being tar-impregnated to retard corrosion and wrapped with a tar-impregnated jute to thermally insulate the strength members from the thermistors in the cable. A number of insulated conductors 3 are placed over the jute wrapping 2 to provide electrical connection to a pressure transducer (not shown) which is located at the bottom end of the cable. A separating layer 4 comprising, for example, an impregnated paper is placed around the conductors 3. A plurality of insulated wires, indicated generally at 5, comprises twisted pairs of leads or metallic conductors 5a insulated from each other with a primary insulation layer 5b, and further may be provided with a jacket 5c. The insulated wires 5 are mounted around the cable in a single layer.

In order to measure temperature gradients, a plurality of temperature sensitive elements 6 are connected to respective conductors 5 at spaced intervals along the cable. A heat-conducting member 7, such as an aluminum tape, is placed over the layer of insulated wires 5 in the region occupied by each of the temperature sensing elements 6 to provide optimum heat transfer to the elements.

A continuous sheath 8 having a substantially uniform diameter is placed around the assembly to protect the various elements. This sheath may advantageously be formed from polyethylene to present a continuous smooth surface which insures ease of handling while at the same time affording protection from the hostile environment.

Figure 2:
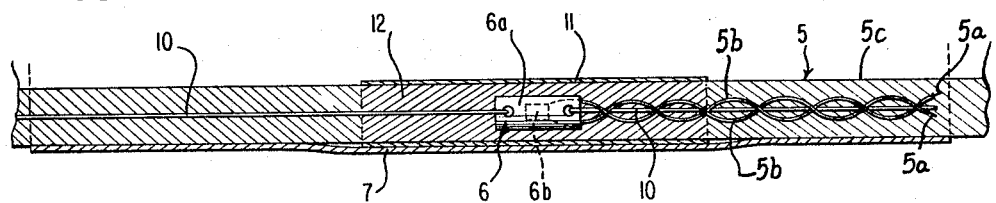
FIGURE 2 is an enlarged cross-sectional view of one of the conductors employed in the cable of the present invention.

Referring to FIGURE 2, there is shown an enlarged cross-sectional view of a wire 5 and the associated temperature sensing element 6 as shown in FIGURE 1, like reference numerals being utilized for common elements. The temperature sensing element 6 comprises a body member 6a in which is mounted a thermistor 6b. The insulated wire 5 is provided with a twisted pair of conductors 5a insulated from each other with insulation layer 5b and a strain relieving member 10 to prevent the imparting of strain to the twisted pair. The strain relieving member 10 is mechanically connected to the body member 6a while the twisted pair are connected to the thermistor 6b mounted within the body member. A heat-conducting member 11, such as an aluminum tape, is placed around the jacket 5c to provide optimum transfer of heat from the water to the thermistor. Similarly, the heat-conducting member 7 is placed over the entire layer of insulated wires 5 to provide the desired heat transfer.

The thermistor is a commercially available product and is provided with two short lead wires which are electrically connected to the conductors 5a of insulated wires 5 and the body member 6a is connected to the strain relieving member 10. The temperature sensing device can then be wrapped with a polyethylene tape 12 until a cross-section substantially the same as that of the jacketed wire 5 is realized. If the polyethylene tape is then heated a bond is effected between the tape and the insulation and a continuous insulated wire having a uniform cross-section results.

Figure 3:
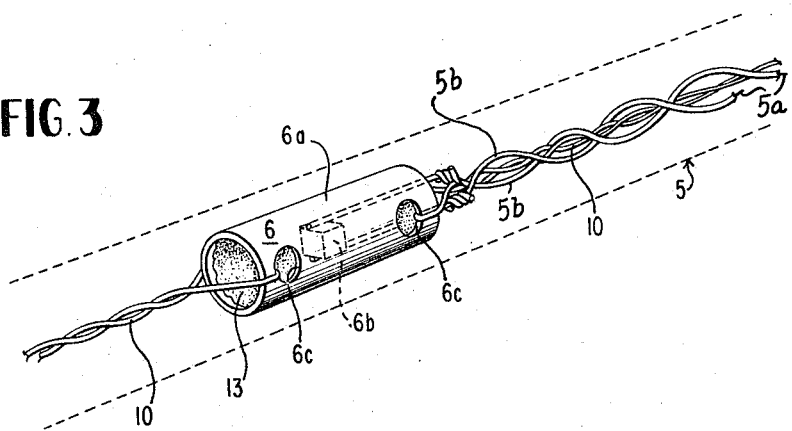
FIGURE 3 is a perspective view showing in detail the mounting of a thermistor with the associated conductor.

Referring to FIGURE 3 there is shown in detail the connection of the temperature sensing device 6 within the insulated wire 5, like reference numerals being given to common elements. As shown, thermistor 6b is positioned within body member 6a, the thermistor being potted therein by a potting material 13 such as polyethylene. The strain relieving member 10 is connected through apertures 6c in the body member 6a to avoid the imparting of any strain to the thermistor 6b by the twisted pair of insulated conductors.

In operation the cable of the present invention is generally suspended from a buoy with a pressure transducer positioned at the bottom end. Pressure measurements are taken by connecting suitable measuring devices to the conductors 3. Similarly, the resistance of the various spaced thermistors is monitored by connecting suitable measuring devices to the insulated wires 5 to provide an indication of the water temperature at the various points along the cable. It is apparent that since the resistance of the thermistors varies widely with temperature that any resistance changes in the conductors 5a themselves caused by temperature changes or strain are negligible.

Through the use of heat conducting members 7 and 11 and a polyethylene sheath 8 a cable is realized having a thermal time constant on the order of 5–8 minutes which is entirely consistent with moored operations. In those applications where a smaller thermal time constant is desirable, such as in towed operation, particles of a material having a high thermal conductivity might advantageously be utilized as an impregnant in the polyethylene material comprising the sheath 8 to provide a faster time response.

The cable of the present invention is a significant advance over prior art devices in that the smooth sheath allows standard shipboard handling techniques to be employed without danger of damage to the thermistors. Also, since the thermistors are completely embedded in their associated conductors adverse affects due to the hostile environment are prevented. Further, although the thermistors are embedded within the cable, the heat-conducting members 7 and 11 provide a good heat transfer path from the water to the thermistors and thus insure accuracy of measurement and an optimum time response to temperature variations. Yet, further, the cable of the present invention is easily manufacturable by first mass producing the insulated wires and electrically connecting the temperature sensing device to the associated conductor. The individual insulated wires 5 are thus easily mass produced and can then be assembled into a cable in accordance with standard techniques.

Although the invention has been described with respect to a specific embodiment, it will be appreciated that modifications and changes may be made by those skilled in the art without departing from the spirit and scope of the invention.

What is claimed as new and desired to be secured by Letters Patent of the United States is:

1. The method of making a cable having a plurality of temperature sensing devices connected to respective ones of a plurality of insulated conductors, each conductor having internal strain relieving member located therein, comprising the steps of:
   (a) first embedding one of said temperature sensing devices in each of said conductors,
   (b) then electrically connecting each of said temperature sensing devices to the associated conductor,
   (c) then mechanically connecting each of said temperature sensing devices to the strain relieving member of the associated conductor,
   (d) then surrounding each conductor with a heat-conducting member in the region occupied by the associated temperature sensing device,
   (e) then assembling said conductors circumferentially around a central strength member with said temperature sensing devices at spaced intervals along the assembly,
   (f) then surrounding the resultant assembly with a heat-conducting member in the region occupied by each of the spaced temperature sensing devices, and
   (g) then applying a sheath over said last named heat conducting member to enclose said assembly.

2. The method of making a cable having a plurality of thermistors connected to respective ones of a plurality of insulated conductors, each conductor having an internal strain relieving member located therein, comprising the steps of:
   (a) first enclosing each of said thermistors in a body member,
   (b) then embedding one of said body members in each of said conductors,
   (c) then electrically connecting each of said thermistors to the associated conductor,
   (d) then mechanically connecting each of said body members to the strain relieving member of the associated conductor,
   (e) then surrounding each conductor with a heat-conducting member in the region occupied by the associated thermistor,
   (f) then assembling said conductors circumferentially around a central strength member with said thermistors at spaced intervals along the assembly,
   (g) then surrounding the resultant assembly with a heat conducting member in the region occupied by each of the spaced thermistors, and
   (h) then applying a continuous sheath over said last named heat-conducting member to enclose said assembly, 3. The method of making a cable having a plurality of thermistors connected to respective ones of a plurality of insulated conductors, each conductor having an internal strain relieving member located therein, comprising the steps of:
   (a) first enclosing each of said thermistors in a body member,
   (b) then opening each of said conductors and positioning one of said body members in each of said openings,
   (c) then electrically connecting each of said thermistors to the associated conductor,
   (d) then mechanically connecting each of said body members to the strain relieving member of the associated conductor,
   (e) then filling the opening in each of said conductors around each body member to substantially the same cross section as the associated conductor,
   (f) then surrounding each conductor with a heat-conducting member in the region occupied by the associated thermistor,
   (g) then assembling said conductor circumferentially around a central strength member with said thermistors at spaced intervals along the assembly,
   (h) then surrounding the resultant assembly with a heat-conducting member in the region occupied by each of the spaced thermistors, and
   (i) then applying a continuous sheath over said last named heat conducting member to enclose said assembly.

4. A cable for measuring temperature gradients in water, comprising:
   (a) a plurality of insulated conductors;
   (b) a plurality of temperature sensing elements, each of said elements being electrically connected to its associated conductor and located at spaced intervals along said cable, and
   (c) means for relieving strain in the connection between each associated conductor and element, said strain relieving means including an encasing means for said element and at least one cord member extending from said encasing means and longitudinally with said associated conductor.

5. A cable according to claim 4 including a longitudinal extension of electrically inert material extending from each encasing means and coterminating at the bottom of said cable length thereby providing a cable having a substantially uniform diameter throughout its length.

6. A cable according to claim 5 wherein said strain relieving means comprises a first cord member extending longitudinally with each of said conductors and mechanically connected to said encasing means and a second cord member embedded in said inert material and extending from said encasing means.

7. A cable according to claim 4 and including a heat conducting member surrounding each element.

8. A cable according to claim 4 and including a jacketing means for each of said conductors.

9. A cable for measuring temperature gradients in water, comprising:
 (a) a central strength member;
 (b) a plurality of insulated conductors arrayed circumferentially around said strength member;
 (c) a plurality of temperature sensing elements, each of said elements being electrically connected to its associated conductor and located at spaced intervals along said cable length;
 (d) an inner sleeve member for encasing each element;
 (e) a potting compound substantially filling said inner sleeve member for encapsulating said element;
 (f) an outer sleeve member encasing each inner sleeve member and encapsulating the inner sleeve member and the electrical connection;
 (g) a cord member extending downwardly from the outer sleeve member; and
 (h) a longitudinal extension of electrically inert material fabricated over each cord member and coterminating at the bottom of said cable length thereby providing a cable having a substantially uniform diameter through its length.

10. A cable according to claim 9 wherein the inner and outer sleeve members are formed of heat-conductive material.

11. A cable according to claim 9 including a jacketing means for each of said conductors.

12. A cable according to claim 4 and including a potting compound substantially filling each encasing means for encapsulating said element.

13. A method of making a cable for measuring temperature gradients in water, comprising:
 (a) forming a plurality of insulated conductors;
 (b) electrically connecting a temperature sensing element with each conductor and at spaced intervals along said cable;
 (c) encasing each element with a sleeve member having at least one cord member extending therefrom longitudinally with each conductor, thereby providing a strain relieving means in the connection between each associated conductor and element; and
 (d) assembling the conductors as a cable.

14. A method of making a cable for measuring temperature gradients in water, comprising:
 (a) forming a plurality of insulated conductors;
 (b) electrically connecting a temperature sensing element to each conductor and located at spaced intervals along said cable;
 (c) encasing each element with a sleeve member;
 (d) connecting a first cord member extending longitudinally with each conductor to each sleeve, and connecting a second cord member to each sleeve and extending longitudinally downwardly therefrom;
 (e) filling each sleeve member with a potting compound thereby encapulating each element;
 (f) fabricating an electrically inert material over each of said second cord members and co-terminating at the bottom of said cable length thereby providing a cable having a substantially uniform diameter throughout its length; and
 (g) assembling each conductor circumferentially around a central strength member and co-terminating therewith.

References Cited
UNITED STATES PATENTS

| | | | |
|---|---|---|---|
| 2,869,226 | 1/1959 | Schurman. | |
| 3,141,232 | 7/1964 | Russell | 29—613 |
| 2,792,481 | 5/1957 | Wood | 338—26 |
| 2,717,945 | 9/1955 | Dresios et al. | 338—26 |
| 3,048,914 | 8/1962 | Kohring | 29—155.63 |
| 3,055,084 | 9/1962 | Canegallo | 29—155.63 |

JOHN F. CAMPBELL, *Primary Examiner.*

C. E. HALL, *Assistant Examiner.*